(12) United States Patent
Ackermann

(10) Patent No.: US 9,004,425 B2
(45) Date of Patent: Apr. 14, 2015

(54) DAMPING DEVICE HAVING A PART MOUNTED THEREON

(75) Inventor: Norbert Ackermann, Eitorf (DE)

(73) Assignee: ZF Friedrichshafen AC, Friedrichshafen (DE)

(*) Notice: Subject to any disclaimer, the term of this patent is extended or adjusted under 35 U.S.C. 154(b) by 28 days.

(21) Appl. No.: 13/466,229

(22) Filed: May 8, 2012

(65) Prior Publication Data

US 2012/0292470 A1 Nov. 22, 2012

(30) Foreign Application Priority Data

May 16, 2011 (DE) .......... 10 2011 075 910

(51) Int. Cl.
| | |
|---|---|
| *F16L 3/223* | (2006.01) |
| *H02G 7/12* | (2006.01) |
| *F16F 9/32* | (2006.01) |
| *F16B 2/08* | (2006.01) |
| *F16B 7/04* | (2006.01) |

(52) U.S. Cl.
CPC .................. *F16F 9/3271* (2013.01); *F16B 2/08* (2013.01); *F16B 7/0433* (2013.01); *F16F 2226/04* (2013.01); *F16F 2230/0005* (2013.01)

(58) Field of Classification Search
CPC .......... F15B 15/08; F15B 15/14; F16L 41/06; F16L 41/12; F16L 3/22; F16L 3/23; F16L 3/237; H02G 7/12; H02G 7/125
USPC ............. 248/230.8, 315, 74.3, 49; 220/23.88, 220/23.89; 138/112, 113; 206/151; 285/188, 197

See application file for complete search history.

(56) References Cited

U.S. PATENT DOCUMENTS

| | | | | |
|---|---|---|---|---|
| 1,801,451 | A * | 4/1931 | Parker ........................... | 138/112 |
| 1,821,234 | A * | 9/1931 | Parker ........................... | 138/112 |
| 1,868,881 | A * | 7/1932 | Burke et al. .................. | 156/258 |
| 2,039,387 | A * | 5/1936 | Burke et al. .................. | 138/112 |
| 3,805,988 | A * | 4/1974 | Walker et al. .............. | 220/23.89 |
| 4,199,009 | A * | 4/1980 | Ballone ........................ | 138/112 |
| 5,511,568 | A * | 4/1996 | Bowman et al. ........... | 134/102.2 |
| 6,316,751 | B1 * | 11/2001 | Wyke et al. .................. | 219/535 |
| 2012/0292470 | A1 * | 11/2012 | Ackermann ............. | 248/222.11 |

FOREIGN PATENT DOCUMENTS

| | | |
|---|---|---|
| DE | 4014469 A1 | 5/1999 |
| DE | 20022067 | 12/2000 |

* cited by examiner

*Primary Examiner* — Tan Le
(74) *Attorney, Agent, or Firm* — Cozen O'Connor

(57) ABSTRACT

A damping device includes a cylinder which is under pressure and which has a connection opening for a mount-on part which is fastened to an outer surface of the cylinder by means of an annular tensioning band element. The tensioning band element encircles the cylinder and the mount-on part on a circumferential region and, by its pretensioning, exerts a holding force on the mount-on part. The tensioning band element is underdimensioned in relation to the cross section of the cylinder and mount-on part and the distance between the two structural component parts and is expanded in a final mounting position in relation to a pre-mounting state in order to apply the pretensioning.

7 Claims, 2 Drawing Sheets

DAMPING DEVICE HAVING A PART MOUNTED THEREON

BACKGROUND OF THE INVENTION

1. Field of the Invention

The present invention is directed to a damping device having a part mounted thereon.

2. Background of the Invention

A damping device having a cylinder which is under pressure and which has a connection opening for a mount-on part is known from DE 40 14 469 A1. The mount-on part is fastened to an outer surface of the cylinder by means of an annular tensioning band element. The tensioning band element encircles the cylinder and the mount-on part on a circumferential region and, by its pretensioning, exerts a holding force on the mount-on part. The tensioning band element according to DE 40 14 469 A1 has a larger circumference than is necessary for fastening the mount-on part to the cylinder. In order to generate the necessary pretensioning force, the tensioning band element is pretensioned in circumferential direction by means of an O-shaped loop. The substantial disadvantage in this principle of construction consists in that the maximum pretensioning that can be achieved within the tensioning band element is determined by the opening force of the O-shaped deformation.

It is an object of the present invention to produce a connection between a mount-on part and a cylinder under pressure by means of a tensioning band element, wherein the holding force of the tensioning band element is appreciably greater than in the prior art.

SUMMARY OF THE INVENTION

This object is met in that the tensioning band element is underdimensioned in relation to the cross section of the cylinder and of the mount-on part and the distance between the two structural component parts and that the tensioning band element is expanded in a final mounting position in relation to a pre-mounting state in order to exert the pretensioning.

In an advantageous manner, the tensioning band element is used in an optimal manner with respect to the possible pretensioning force. There is no need for additional tightening means to generate the pretensioning force. Consequently, the structural component parts which are held together by the tensioning band element are also simplified.

In another advantageous embodiment, the tensioning band element contacts at least one tensioning surface of the cylinder and a tensioning surface of the mount-on part at a distance therefrom, the distance between the at least two tensioning surfaces being bridged by the tensioning band element by the smallest possible length of a connecting portion. In this way, it is ensured that the tensioning band element is exposed to exclusively tensile loading at every point in circumferential direction.

In another advantageous embodiment, the tensioning band element is constructed as a seamless structural component part. For example, a tubular semifinished product can be used and the tensioning band elements can be cut therefrom. Because of the seamless construction, there are no weak points in the tensioning band element and all of the portions of the tensioning band element can be equally loaded without fear of breakage.

In order to facilitate assembly, in particular to simplify the mounting device, the mount-on part and/or the cylinder have/has a mounting bevel disposed anterior to a clamping area. The structural component parts to be connected expand the tensioning band element.

In order to achieve a pretensioning force of the tensioning band element that is as uniform as possible, the tensioning band element is pretensioned until the plastic deformation region. Therefore, unavoidable tolerance variations in the diameter of the cylinder and/or mount-on part do not have a significant influence.

The tensioning band element can optionally have a U-shaped cross section. This minimizes the risk of tearing at the edges of the tensioning band element and a large pressing surface is obtained for displacing the tensioning band element into its final mounting position.

For easy monitoring of the correct installation position of the tensioning band element, the cylinder and/or the mount-on part have/has a contact surface for the tensioning band element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail below in connection with the following drawings in which.

DETAILED DESCRIPTION OF THE PRESENTLY PREFERRED EMBODIMENTS

Figure 1:
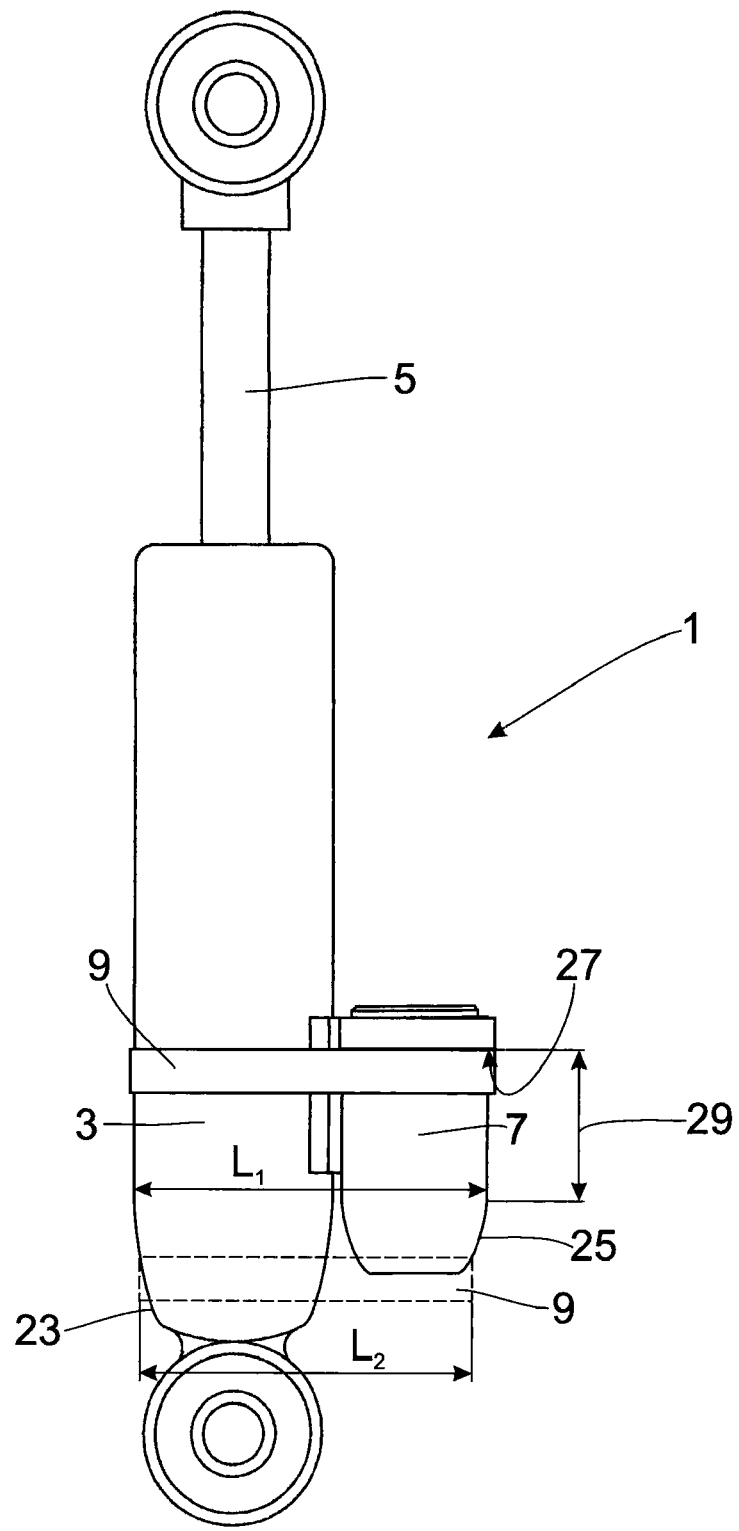
FIG. 1 is a general side view of the damping device.
Figure 2:
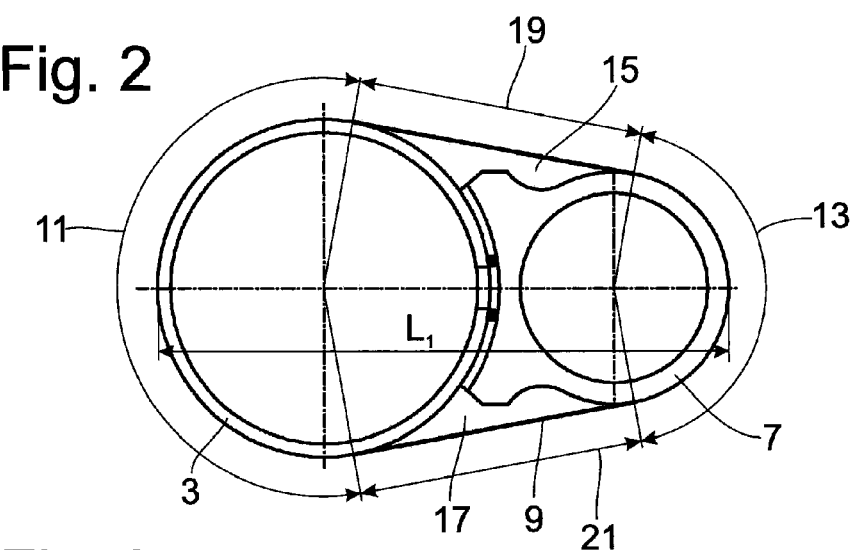
FIG. 2 is a cross sectional view through the damping device.
Figure 3:
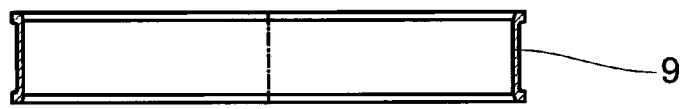
FIG. 3 is a longitudinal sectional view through the tensioning band element.
Figure 4:
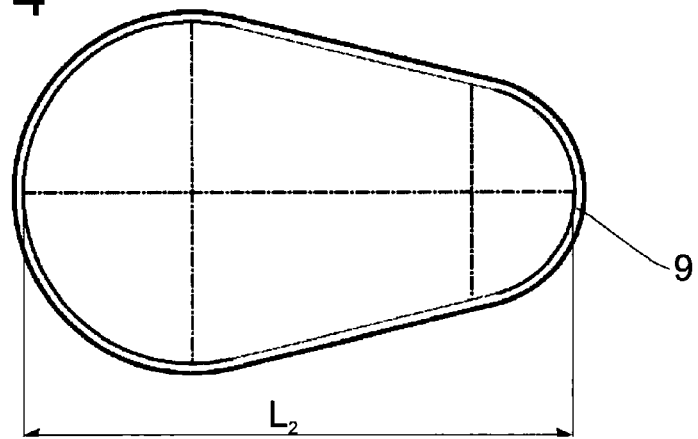
FIG. 4 is a top view of the tensioning band element.

FIG. 1 shows a damping device 1 having a cylinder 3 which is under pressure and in which a piston rod 5 executes an axial stroke movement and accordingly changes the pressure in the cylinder filled with a damping medium in a pulsating manner. The cylinder 3 has a connection opening covered by the mount-on part 7. The mount-on part 7 is constructed as an axially parallel second cylinder having at least one annular tensioning band element 9 is fastened to a lateral surface of the cylinder 3. When viewed in conjunction with FIGS. 2 to 4, it can be seen that the tensioning band element 9 surrounds a circumferential region of the cylinder 3 and of the mount-on part 7. Both the cylinder 3 and the mount-on part 7 have at least one tensioning surface. The tensioning surfaces 11, 13 are confined to a circumferential region on these two structural component parts 3, 7. Based on the outer geometry of the cylinder 3 and mount-on part 7, FIG. 2 shows a cross section with radial indentations. Connecting portions 19, 21 of the tensioning band element do not contact the two structural component parts 3, 7 in the region of the indentations 15, 17. In a different geometry of the structural component parts, the indentations 15, 17 can also be completely absent. The distance between the at least two tensioning surfaces 11, 13 is bridged by the tensioning band element 9 with the smallest possible length of the connecting portions 19, 21. There need not necessarily be two connecting portions 19, 21. The quantity of connecting portions 19, 21 depends on the quantity of tensioning surfaces 11, 13; each structural component part 3, 7 can also have a plurality of tensioning surfaces contacted by the tensioning band element.

As can be seen from FIG. 1, the mount-on part 7 and the cylinder 3 both have mounting bevels 23, 25 which are formed in direction of a mounting arrangement, not shown. FIG. 1 shows the tensioning band element 9 in a pre-mounting state in dashed lines. It will be seen that the radial extension $L_2$ of the tensioning band element 9 is smaller than the principal axis of the outer contour of the mount-on part 7 with the cylinder 3.

In the mounting process, the mount-on part 7 is positioned on the lateral surface of the cylinder 3 and held in place in an arrangement which is not shown. The tensioning band element 9 is displaced axially by an axial displacement by means of the arrangement along the longitudinal axis of the damping device or structural component parts 3, 5 until the tensioning band element has reached a final mounting position at a contact surface 27 on a clamping region 29. On the displacement path along the mounting bevels 23, 25, the tensioning band element 9 is radially expanded so that, as is shown in FIG. 2, it encircles both the mount-on part 7 and the cylinder 3 on the circumferential portions or tensioning surfaces 11, 13. In so doing, the tensioning band element 9 is pretensioned until the plastic deformation region. In order to minimize tearing at the edges of the tensioning band element 9, the tensioning band element 9 preferably has a U-shaped cross section which, further, offers an improved contact surface, i.e., a larger contact surface, for the displacing tool of the arrangement in the mounting sequence. As can be seen particularly from FIGS. 3 and 4, the tensioning band element 9 can be constructed as a seamless structural component part. A simple tube which is cut off and pre-shaped according to FIG. 4 can serve as semifinished product. Trials have shown that a very high holding force combined with a long life of the employed structural component parts can be achieved with a circumferential length of the tensioning band element 9 having a three-percent underdimensioning with respect to the total length including the radian measures of the tensioning surfaces 11, 13 and the lengths of the connecting portions 19, 21.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A damping device comprising:
    a cylinder (3) under internal pressure having an outer surface and a connection opening;
    a mount-on part (7);
    an annular tensioning band element (9) for fastening said mount-on part (7) to said outer surface so as to cover said connection opening; said cylinder and said mount-on part having a cross section and a distance therebetween; said tensioning band element (9) encircling a circumferential region of each of said cylinder (3) and said mount-on part (7) and exerting a holding force on said mount-on part (7) by pretensioning; said tensioning band (9) being in continuous and uninterrupted contact with all of the circumferential region of said cylinder (3) that said tensioning band encircles to exert a holding force; said tensioning band element (9) being constructed so as to be under-dimensioned in relation to the cross section of said cylinder and of said mount-on part and the distance between said cylinder and said mount-on part (7);
    said tensioning band element being expanded in a final mounting position in relation to a premounting state so as to apply said pretensioning.

2. The damping device according to claim 1, wherein said cylinder (3) comprises a first tensioning surface and said mount-on part comprises a second tensioning surface at a distance from said first tensioning surface; said tensioning band element contacting said first and second tensioning surfaces and bridging the distance between said tensioning surfaces by the smallest possible length.

3. The damping device according to claim 1, wherein said tensioning band element (9) is constructed as a seamless structural component part.

4. The damping device according to claim 1, wherein at least one of said mount-on part (7) and said cylinder (3) comprises a mounting bevel (23, 25) and a clamping area (29) and wherein said mounting bevel is disposed anterior to said clamping area (29).

5. The damping device according to claim 1, wherein said tensioning band element (9) is pretensioned until the plastic deformation region.

6. The damping device according to claim 1, wherein said tensioning band element (9) has a U-shaped cross section.

7. The damping device according to claim 1, wherein at least one of said cylinder (3) and said mount-on part (7) comprises a contact surface for said tensioning band element (9).

* * * * *